(12) United States Patent
Adamek et al.

(10) Patent No.: US 9,042,659 B2
(45) Date of Patent: May 26, 2015

(54) METHOD AND SYSTEM FOR FAST AND ROBUST IDENTIFICATION OF SPECIFIC PRODUCT IMAGES

(75) Inventors: Tomasz Adamek, Madrid (ES); Javier Rodriguez Benito, Madrid (ES)

(73) Assignee: Telefonica, S.A., Madrid (ES)

( * ) Notice: Subject to any disclaimer, the term of this patent is extended or adjusted under 35 U.S.C. 154(b) by 95 days.

(21) Appl. No.: 13/806,788

(22) PCT Filed: Jun. 21, 2011

(86) PCT No.: PCT/EP2011/060297
§ 371 (c)(1),
(2), (4) Date: Apr. 25, 2013

(87) PCT Pub. No.: WO2011/161084
PCT Pub. Date: Dec. 29, 2011

(65) Prior Publication Data
US 2013/0202213 A1     Aug. 8, 2013

(30) Foreign Application Priority Data

Jun. 25, 2010   (ES) .................................. 201030985

(51) Int. Cl.
*G06K 9/46*        (2006.01)
*G06F 17/30*       (2006.01)
(Continued)

(52) U.S. Cl.
CPC ............ *G06F 17/30277* (2013.01); *G06K 9/42* (2013.01); *G06K 9/4676* (2013.01); *G06K 9/6205* (2013.01)

(58) Field of Classification Search
CPC .............................. G06F 17/3027; G06K 9/42
USPC ........................................... 382/201, 225, 305
See application file for complete search history.

(56) References Cited

U.S. PATENT DOCUMENTS 6,711,293 B1    3/2004  Lowe
6,834,288 B2 *  12/2004 Chen et al. ............................ 1/1
(Continued)

FOREIGN PATENT DOCUMENTS

| EP | 1850270 | 10/2007 |
|----|---------|---------|
| EP | 1863162 | 12/2007 |
| WO | 2011161084 | 12/2011 |

OTHER PUBLICATIONS

International Search Report for PCT/EP2011/060297 dated Feb. 22, 2012.
(Continued)

*Primary Examiner* — Gregory M Desire
(74) *Attorney, Agent, or Firm* — Gardner Groff Greenwald & Villanueva, PC

(57) ABSTRACT

Identification of objects in images. All images are scanned for key-points and a descriptor is computed for each region. A large number of descriptor examples are clustered into a Vocabulary of Visual Words. An inverted file structure is extended to support clustering of matches in the pose space. It has a hit list for every visual word, which stores all occurrences of the word in all reference images. Every hit stores an identifier of the reference image where the key-point was detected and its scale and orientation. Recognition starts by assigning key-points from the query image to the closest visual words. Then, every pairing of the key-point and one of the hits from the list casts a vote into a pose accumulator corresponding to the reference image where the hit was found. Every pair key-point/hit predicts specific orientation and scale of the model represented by the reference image.

16 Claims, 9 Drawing Sheets

(51) Int. Cl.
*G06K 9/42* (2006.01)
*G06K 9/62* (2006.01)

(56) References Cited

U.S. PATENT DOCUMENTS

| | | | | |
|---|---|---|---|---|
| 8,374,437 | B2 * | 2/2013 | Nakamura et al. | 382/201 |
| 8,488,883 | B2 * | 7/2013 | Gutelzon et al. | 382/176 |
| 8,489,589 | B2 * | 7/2013 | Mei et al. | 707/728 |
| 8,611,677 | B2 * | 12/2013 | Das et al. | 382/225 |
| 2006/0119900 | A1 * | 6/2006 | King et al. | 358/462 |
| 2007/0214172 | A1 | 9/2007 | Nister et al. | |
| 2011/0208822 | A1 * | 8/2011 | Rathod | 709/206 |

OTHER PUBLICATIONS

Tirilly, et al. "Language modeling for bag-of-visual words image categorization", Proceedings of the 2008 International Conference on Content-Based Image and Video Retrieval, Jan. 2008, p. 249.

Yuan, et al. "Discovery of COllaction Patterns: from Visual Words to Visual Phrases", IEEE Conference on Computer Vision and Pattern Recognition, Jun. 2007, pp. 1-8.

Lowe, "Object recognition from location scale-invariant features", Computer Vision, Sep. 1999, pp. 1150-1157.

Turcot, et al. "Better matching with fewer features: The selection of useful features in large database recognition problems", IEEE 12th International Conference on Computer Vision Workshops, Sep. 2009, pp. 2109-2116.

Younessian, et al. "Telefonica Research at TRECVID 2010 Content-Based Copy Detection", NIST TRECVID Workshop Notebook, Nov. 2010, <http://www-nlpir.nist.gov/projects/tvpubs/tv18.papers/tid.pdf>.

Chimlek, et al. "Semantically similar visual words discovery to facilitate visual invariance", Multimedia and Expo, Jul. 2010, pp. 1242-1247.

Sivic, et al. "Video google: a text retrieval approach to object matching in videos", Proceedings of the Eight IEEE International Conference on Computer Vision, Oct. 2003, pp. 1470-1477.

International Preliminary Report on Patentability for PCT/EP2011/060297 mailed Jun. 28, 2012.

* cited by examiner

METHOD AND SYSTEM FOR FAST AND ROBUST IDENTIFICATION OF SPECIFIC PRODUCT IMAGES

IN THE CROSS-REFERENCE TO RELATED APPLICATIONS

This application is a U.S. national phase application under 35 USC 371 of international application number PCT/EP2011/060297, filed Jun. 21, 2011, which claims priority to Spanish Application No. P201030985, filed Jun. 25, 2010, which is hereby incorporated herein by reference in its entirety for all purposes.

BACKGROUND OF THE INVENTION

1. Technical Field

The present invention relates to the field of Content-based Multimedia Information Retrieval [LSDJ06] and Computer Vision. More specifically, the invention contributes to the areas of Content-based Multimedia Information Retrieval concerned with the problem of searching large collections of images based on their content, and also to the area of Object Recognition which in Computer Vision is the task of finding a given object in an image or a video sequence.

2. Description of Related Art

Identifying a particular (identical) object in a collection of images is now reaching some maturity [SZ03]. The problem still appears challenging because objects' visual appearance may be different due to changes in viewpoint, lighting conditions, or due to partial occlusion, but solutions performing relatively well with small collections already exist. Currently the biggest remaining difficulties appear to be partial matching, allowing recognition of small objects "buried" within complex backgrounds, and scalability of systems needed to cope with truly large collections.

Now, recent relevant advances in the field of recognition performance will be discussed, specifically in the context of rapid identification of multiple small objects in complex scenes based on large collection of high-quality reference images.

In the late nineties David Lowe pioneered a new approach to object recognition by proposing the Scale-Invariant Feature Transform (widely known as SIFT) [LOW99] (U.S. Pat. No. 6,711,293). The basic idea behind Lowe's approach is fairly simple. Objects from the scene are characterized by local descriptors representing appearance of these objects at some interest points (salient image patches). The interest points are extracted in a way that is invariant to scale and rotation of objects present in the scene. FIG. 1 shows examples of SIFT interest key-points [LOW99, LOW04] detected for two photos of the same scene taken from significantly different points of view. The interest points are represented by circles. Centers of circles represent locations of key-points and their radiuses represent their scales. Intuitive interpretation of SIFT interest points is that they correspond to blob-like or corner-like structures and theirs scales closely corresponds to the size of these structures. It should be noted that, irrespectively to the viewing angles, most of the key-points are detected at the same position in the scene. The original images belong to the dataset created by Mikolajczyk et al., [MS04].

Descriptors extracted from a single training image of a reference object can then be used to identify instances of the object in new images (queries). Systems relying on the SIFT points can robustly identify objects in cluttered scenes, irrespectively on their scale, orientation, noise, and also, to a certain extend, on changes in viewpoint and illumination. Lowe's method has found many applications, including image retrieval and classification, object recognition, robot localization, image stitching and many others.

Encouraged by the performance of the SIFT method many researchers focused their work on further extending the capabilities of the approach. For example, Mikolajczyk and Smith [MS04] proposed affine covariant detectors that enabled unprecedented robustness to changes in viewing angles. Matas et al. [MCUP02] proposed an alternative method for extracting feature points termed Maximally Stable Extremal Regions which extracts interest points different to the ones selected by the SIFT detector. Very recently, Bay et al. [BTG06] proposed computationally efficient version of the SIFT method termed Speeded Up Robust Features (SURF). Surprisingly, the SURF detector is not only three times faster than the SIFT detector, but also, in some applications, it is capable of providing superior recognition performance. One of the most interesting examples of application of SURF is recognition of objects of art in an indoor museum containing 200 artifacts, providing recognition rate of 85.7%.

In many application areas the success of the feature point approaches has been truly spectacular. However, until recently, it was still impossible to build systems able to efficiently recognize objects in large collections of images. This situation improved when Sivic and Zisserman proposed to use feature points in a way, which mimics text retrieval systems [SZ03, SIV06]. In their approach, which they termed "Video Google", feature points from [MS04] and [MCUP02] are quantized by k-means clustering into a vocabulary of the so-called Visual Words. As a result, each salient region can be easily mapped to the closest Visual Word, i.e. key-points are represented by visual words. An image is then represented as a "Bag of Visual Words" (BoW), and these are entered into an index for later querying and retrieval. The approach is capable of efficient recognition in very large collection of images. For example, identification of a small region selected by the user in a collection of 4 thousand images takes 0.1 seconds.

Although the results of the "Video Google" were very impressive, especially when compared to other methods available at the time, searching for entire scenes or even large regions was still prohibitively slow. For example, matching scenes represented using images of size 720×576 pixels in the collection of 4 thousands images took approximately 20 seconds [SIV06]. This limitation was alleviated to a certain extend by Nister and Stewenius [NS06] who proposed a highly optimized image based search engine able to perform close to real-time image recognition in larger collections. In particular, their system was capable of providing good recognition results of 40000 CD covers in real-time.

Finally, very recently, Philbin et al. [PCI+07, PCI+08] proposed an improved variant of the "Video Google" approach and demonstrated that it is able to rapidly retrieve images of 11 different Oxford "landmarks" from a collection of 5 thousands high resolution (1024×768) images collected from Flickr [FLI].

The recent spectacular advances in the area of visual object recognition are starting to attract a great interest from the industry. Currently several companies are offering technologies and services based, at least partially, on the above-mentioned advances.

Kooaba [KOO], a spin-off company from the ETH Zurich founded at the end of 2006 by the inventors of the SURF approach [BTG06], uses object recognition technology to provide access and search for digital content form mobile phones. Kooaba's search results are accessed by sending a picture as a query. They advocate their technology as allowing to literally "click" on real-world objects such as movie posters, linked articles in newspapers or magazines, and in the future even on tourist sights.

Evolution Robotics in Pasadena, Calif., [EVO] developed a visual search engine able to recognize what the user took a picture of, and then advertisers can use that to push relevant content to user's cellphone. They predict that within the next 10 years one will be able to hold up his cellphone and it will visually tag everything in front of him. One of the advisors of Evolution Robotics is Dr. David Lowe, the inventor of the SIFT approach [LOW99].

SuperWise Technologies AG [SUP], company that has developed the Apollo image recognition system, developed a novel mobile phone program called eye-Phone, able to provide the user with tourist information whenever he is. In other words, eye-Phone can provide information on what the user sees when he sees it. The program combines three of today's modern technologies: satellite navigation localization services, advanced object recognition and relevant Internet retrieved information. With the eye-Phone on his phone, for instance while out walking, the user can take a photograph with his mobile phone and select the item of interest with the cursor. The selected region is then transmitted with satellite navigation localization data to a central system performing the object recognition and interfacing to databases on the Internet to get information on the object. The information found is sent back to the phone and displayed to the user.

Existing approaches have relevant limitations. Currently, only methods relying on local image features appear to be close to fulfilling most of the requirements needed for a search engine that delivers results in response to photos.

One of the first systems belonging to this category of methods and performing real-time object recognition with a collections of tens of images was proposed by David Lowe, the inventor of SIFT [LOW99, LOW04]. In the first step of this approach key-points were matched independently to the database of key-points extracted from reference images using an approximate method for finding nearest neighbours termed Best-Bin-First (BBF) [BL97]. These initial matches were further validated in the second stage by clustering in pose space using the Hough transform [HOU62]. This system appears to be well suited for object recognition in the presence of clutter and occlusion, but there is no evidence in the literature that it can scale to collections larger than tens of images.

To improve scalability, other researchers proposed to use feature points in a way, which mimics text-retrieval systems [SZ03, SIV06]. For example, Sivic and Zisserman [SZ03, SIV06, PCI+07, PCI+08] proposed to quantize key-point descriptors by k-means clustering creating the so-called "Vocabulary of Visual Words". The recognition is performed in two stages. The first stage is based on the vector-space model of information retrieval [BYRN99], where the collection of visual words are used with the standard Term Frequency Inverse Document Frequency (TF-IDF) scoring of the relevance of an image to the query. This results in an initial list of top n candidates potentially relevant to the query. It should be noted that typically, no spatial information about the image location of the visual words is used in the first stage. The second step typically involves some type of spatial consistency check where key-point spatial information is used to filter the initial list of candidates. The biggest limitation of approaches from this category originates from their reliance on TF-IDF scoring, which is not particularly well suited to identifying small objects "buried" in cluttered scenes. Identification of multiple small objects requires accepting much longer lists of initial matching candidates. This results in increase of the overall cost of matching since the consecutive validation of spatial consistency is computationally expensive when compared to the cost of the initial stage. Moreover, our experiments indicate that these types of methods are ill suited to identification of many types of real products, such as for example soda cans or DVD boxes, since the TF-IDF scoring is often biased by key-points from borders of the objects which are often assigned to visual words that are common in scenes containing other man-made objects.

Because of the computational cost of the spatial consistency validation step, Nister and Stewenius [NS06] concentrated on improving the quality of the pre-geometry stage of retrieval, which they suggest is crucial in order to scale up to large databases. As a solution, they proposed hierarchically defined visual words that form a vocabulary tree that allows more efficient lookup of visual words. This enables use of much larger vocabularies which shown to result in an improvement in quality of the results, without involving any consideration of the geometric layout of visual words. Although this approach scales very well to large collections, so far it has been shown to perform well only when the objects to be matched cover most of the images. It appears that this limitation is caused by the reliance on a variant of TF-IDF scoring and the lack of any validation of spatial consistency.

SUMMARY OF THE INVENTION

An object of the present invention is to develop a search engine that delivers results in response to photos instead of textual words. A scenario is assumed where the user supplies a query image containing the objects to be recognized, and the system returns a ranked list of reference images that contain the same objects, retrieved from a large corpus. In particular it is an object to develop a method particularly suited to recognition of a wide range of 3D products potentially relevant to many attractive use case scenarios such as for example books, CDs/DVDs, packed products in food stores, city posters, photos in newspapers and magazines, and any objects with distinctive trademarks, etc.

A typical query image is expected to contain multiple objects to be recognized placed within a complex scene. Moreover, it is not unusual for a query image to be of poor quality (e.g. taken by a mobile phone camera). On the other hand, each reference image is assumed to contain only one well-posed reference object and a relatively simple background. It is desirable that the system allows indexing of a large number of reference images (>1000), and is capable of rapid (<5 seconds) identification of objects present in a query image by comparing it with the indexed images. The search engine should provide meaningful results irrespectively on location, scale, and orientation of the objects in the query image and it should be robust against noise and, to a certain extend, against changes in viewpoint and illumination. Finally the search engine should allow for fast (on-the-fly) insertion of new objects into the database.

In order to comply with at least a part of these objects, according to the invention a method and a system according to the independent claims are provided. Favourable embodiments are defined in the dependent claims.

The basic idea behind the proposed invention is to identify objects from the query image in a single step, performing a partial validation of spatial consistency between matched visual words by direct use of the vocabulary of visual words and our extension of the inverted file structure.

In other words, the proposed invention combines the exceptional scalability of methods relying on clustering of descriptors into vocabularies of visual words [SZ03, SIV06, NS06, PCI+07, PCI+08], with the robustness against clutter and partial occlusions of the methods relying on spatial consistency validation using the Hough transform [HOU62, LOW99, LOW04]. From one point of view, the invention can be seen as an attempt to eliminate the initial recognition stage relying on the vector-space model (TF-IDF scoring) from the approaches based on vocabularies of visual words, and instead, perform recognition in a single step involving validation of spatial consistency between matched visual words. On the other hand, the invention can be also seen as an attempt to replace the approximate nearest neighbours search from the method proposed in [LOW99, LOW04] with the matching using vocabularies of visual words.

The present invention is intended to take advantage of the fact that, in many application scenarios, it is acceptable to assume that each reference image contains only one well-posed reference object (i.e. model) and a relatively simple background. It should be noted that no assumptions are made regarding the number of objects and background complexity in the query image. This is in contrast to any existing methods, where typically both, the query and reference images are processed effectively in the same way. Moreover, the intention was to develop a method well suited to recognition of a wide range of 3D products potentially relevant to many attractive use case scenarios such as for example books, CDs/DVDs, packed products in food stores, city posters, photos in newspapers and magazines, and any objects with trademarks, etc. In cases where the query image contains an object to be recognized belonging to a family of products with common subset of trademarks, e.g. many Coca-Cola products contain Coca-Cola logo, the system should return a ranked list of all relevant products having similar trademarks.

Experiments indicate that the invention results in a significant advance in terms of recognition performance, specifically in the context of rapid identification of multiple small objects in complex scenes based on large collection of high-quality reference images.

The present approach relies on local image features. All images are scanned for "salient" regions (key-points) and a high-dimensional descriptor is computed for each region. Key-points detected at very low and very high scales are eliminated, and, in the case of reference images, key-point scales are normalized in respect to an estimated size of the depicted reference object. In an off-line process a large number of descriptor examples are clustered into the Vocabulary of Visual Words, which defines a quantization of the descriptor space. From this moment every key-point can be mapped to the closest visual word.

However, in contrast to other approaches from this category, the images are not represented as Bags of Visual Words. Instead, we propose to extend the inverted file structure proposed in [SZ03] to support clustering of matches in the pose space, in a way resembling the well known Hough transform. In order to keep the computational cost low it is proposed to limit the pose space solely to orientation and scale. The inverted file structure has a hit list for every visual word, which stores all occurrences of the word in all reference images. In contrast to other approaches, every hit stores not only an identifier of the reference image where the key-point was originally detected, but also information about its scale and orientation. Moreover, every hit has an associated strength of the evidence with which it can support an existence of the corresponding object. The hit's strength is computed based on its scale (key-points detected at higher scale are more distinctive), and the number of hits assigned to the same visual word and having similar orientation and scale. In a similar manner, every key-point from the query image has also associated strength of the evidence it can provide. In this case, the strength depends only on the number of key-points from the query assigned to the same visual word and having similar orientation and scale. Recognition starts by assigning key-points from the query image to the closest visual words. In fact, this step is equivalent to assigning each query key-point to an entire list of hits corresponding to the same visual word. Then, every pairing of the key-point and one of the hits from the list casts a vote into a pose accumulator corresponding to the reference image where the hit was found. Every pair key-point/hit predicts specific orientation and scale of the model represented by the reference image. The strength of each vote is computed as a dot product of the strengths of the key-point and the hit. Once all votes are casted, all bins from accumulators that received at least one vote are scanned in order to identify bins with maximum number of votes. Values accumulated in these bins are taken as the final relevancy scores for the corresponding reference images. Finally, reference images are ordered according to the relevancy scores and the most relevant objects are selected based on an extension of the dynamic thresholding method from [ROS01].

These and other aspects of the invention will be apparent from and elucidated with reference to the embodiments described hereinafter.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF THE PRESENT INVENTION

An exemplary embodiment will be described of the method for identification of specific objects in images according to the invention.

The proposed approach consists of four main components (stages):

1. Feature Extraction involves identification of "salient" image regions (key-points) and computation of their representations (descriptors)—see the example in FIG. 1. This stage includes also post-processing of key-points where key-points that are not useful for the recognition process are eliminated. It should be noted that the feature extraction is performed for both: images representing reference objects (reference images) and images representing unknown objects to be identified (query images).

2. Construction of Visual Words Vocabulary is an off-line process, where a large number of descriptor examples are clustered into vocabularies of visual words. The role of such vocabularies is to quantize the descriptor space. Once the vocabulary is created key-points from reference and query images can be mapped to the closest visual words. In other words, key-points can be represented by identifiers of visual words, instead of multi-dimensional descriptors.

3. Indexing of Reference Images involves extraction of local features for reference images and their organisation into a structure allowing their fast matching with features extracted from query images. This process consists of (i) key-point extraction and (ii) post-processing, (iii) assignment of key-points to visual words, (iv) estimation of voting weights, and (v) addition of key-points to an inverted file structure as the so-called hits—see an overview of the indexing process in FIG. 4. Adding a new reference object to the database involves adding hits representing key-points to the inverted file structure. In the inverted file structure there is one list (hit list) for every visual word that stores all occurrences (hits) of the word in reference images—see FIG. 5. Every hit corresponds to one key-point from a reference image and stores the identifier of the reference image where the key-point was detected and information about its scale and orientation. Moreover, every hit has an associated weight (strength) with which it can support existence of the corresponding reference object in response to an occurrence of the visual word in an input image.

4. Recognition of objects present in the query image consists of the following steps: (i) key-point extraction and (ii) post-processing, (iii) assignment of key-points to visual words, (iv) calculation of voting weights (strengths) corresponding to every key-point, (v) aggregation of evidences provided by pairs (query key-point, hit) in vote accumulators, (vi) identification of the matching scores corresponding to every reference image, and finally (vii) ordering and selection of the most relevant results based on an extension of the dynamic threshold method from [ROS01]. An overview of the recognition process can be seen in FIG. 3.

Figure 2:
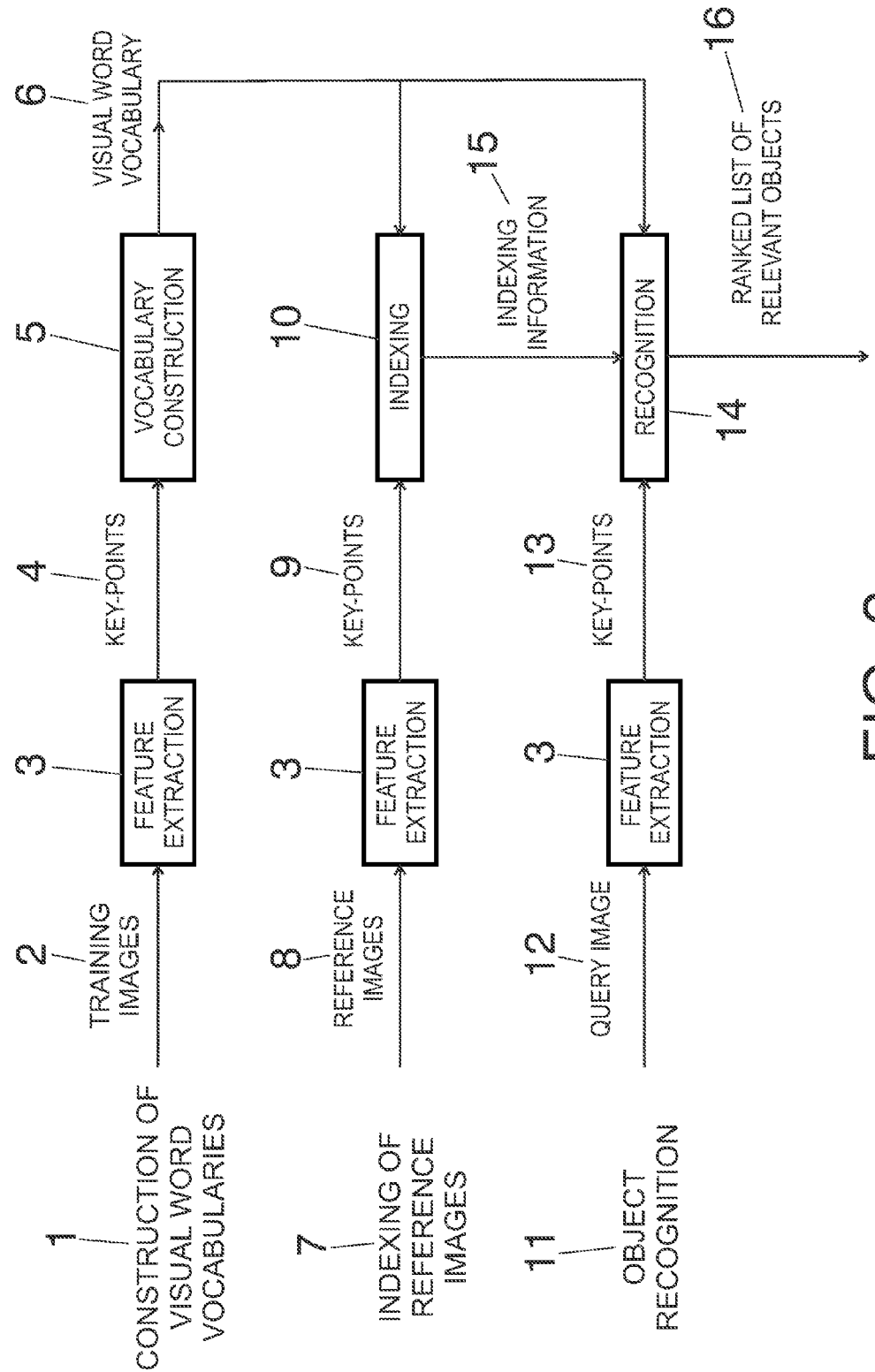
FIG. 2 shows an overview of the method according to an embodiment of the present invention showing the relation between its main components.

The relation between the main components or "stages" of the approach is demonstrated in FIG. 2. It should be noted that the creation of vocabularies, indexing and recognition require feature extraction step. Also, indexing and recognition require using a vocabulary of visual words created from a large collection of training images. All the above stages are discussed in more detail herein after.

Feature Extraction and Post-Processing

Local Features

In the proposed approach images are represented by a set of highly distinctive local features (key-points). These local features can be seen as salient image patches that have specific and invariant characteristics that can be stored in the database and compared. In other words, the proposed search engine requires that every image is represented as a set of key-points, each with specific location, scale, orientation and descriptor.

Figure 1:
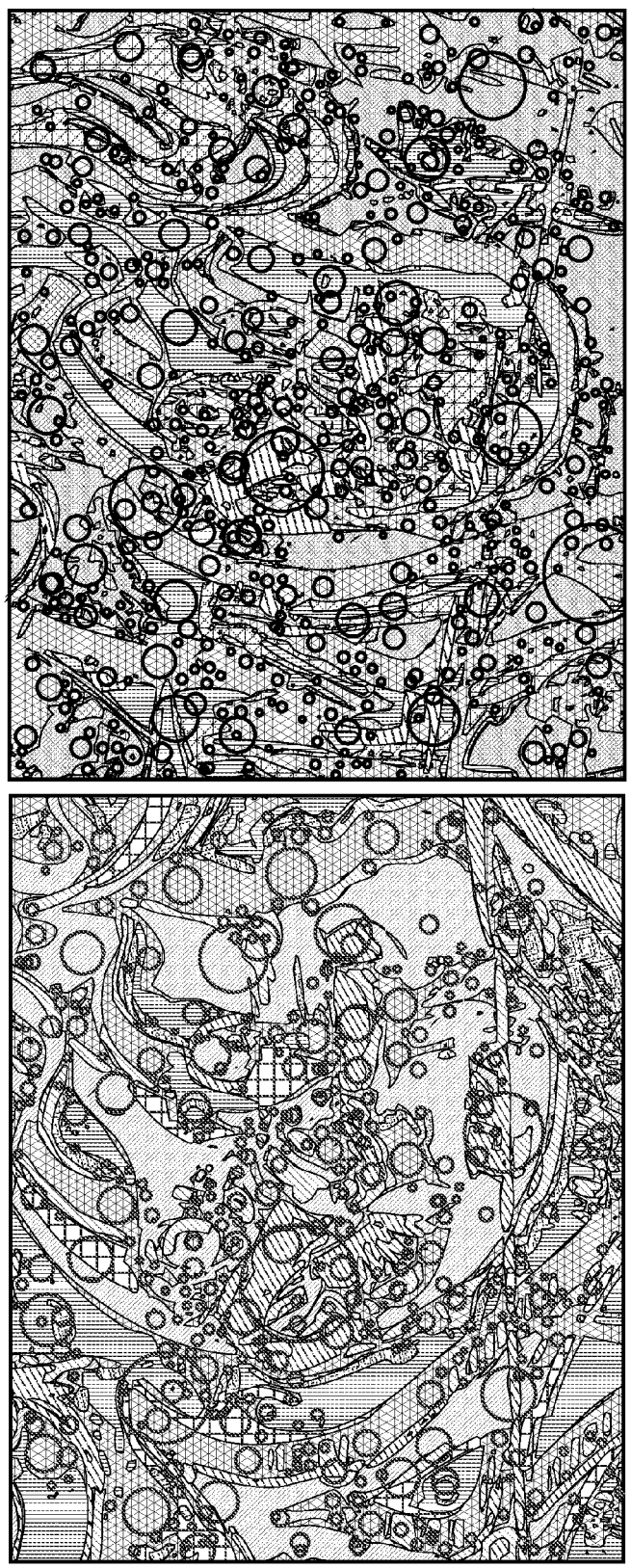
FIG. 1 shows the detection of key-points in an image according to the prior art.

In order to be useful for object recognition the key-points have to be detectable in a consistent way irrespectively on objects' location, size, orientation, noise, clutter and changes in illumination and camera viewpoint. The number of points detected in every image has to be sufficient to represent all potentially interesting elements of the scene. Moreover, key-point descriptors have to be reasonably distinctive in order to facilitate identification of corresponding key-points from different images. Finally, the feature extraction has to be computationally efficient because object recognition involves online key-point detection in query images. An example of useful key-points is shown in FIG. 1.

In the developed prototype the local features are extracted using Scale Invariant Feature Transform (SIFT) [LOW99, LOW04] (U.S. Pat. No. 6,711,293). However, the proposed search engine should provide similar or better performance when used with other alternative representations such as for example Speeded Up Robust Features (SURF) [BTG06](European Patent EP1850270), Maximally Stable Extremal Regions [MCUP02] or Affine Covariant Detectors [MS04].

Key-Point Post-Processing

The performed experiments indicate that not all key-points are equally useful for object identification. For example, in cases of high-resolution images many of the key-points detected at the lowest scales do not represent any discriminatory patterns, but simply correspond to different types of noise or artefacts.

The most commonly used detectors, such as for example SIFT, allow to control the number of key-points and the range of analysed scales mainly by adjusting the resolution of input images. This mechanism does not permit to relate the range of scales being used to the size of the objects being represented. This means that all reference images should have approximately the same resolution in order to ensure meaningful comparisons.

To alleviate this problem, it is proposed to perform an additional post-processing step that: (i) normalizes key-point scales according to the size of reference objects and (ii) eliminates key-points that cannot effectively contribute to the recognition process based on their normalized scales. It is assumed that every reference image should contain only one example of a reference object and a relatively simple and uniform background. Most of the key points should be detected in areas corresponding to the reference object, while the background should not generate significant number of key points. In such images it is possible to automatically detect the so-called Region of Interest (ROI) based on the locations of the detected key-points. For simplicity only rectangular ROIs are considered.

In the case of reference images the center of the ROI is estimated as the center of the mass of the set of all detected key-point locations. Its initial width and height are computed independently in the horizontal and vertical directions as four times the values of the standard deviation of key-point locations. In order to minimize the influence of noisy regions key-point locations are weighted according to key-point scales. Finally, the initial boundaries are adjusted ("shrunk") whenever they cover areas without any key-points.

The length of the ROI's diagonal is used to normalize the scales of all key-points. It should be noted that since ROIs depend only on sizes of depicted objects, they provide ideal references for normalizing scales of key-points in a way that is independent on the image resolution.

Once the ROI is identified, key-points located outside the ROI are eliminated. Then, key-points with normalized scale smaller than a predefined value are also eliminated. All remaining key-points are sorted according to their normalized scales and only a predefined number of points with the largest scales are retained. In most applications limiting the number of key-points in reference images to 800 leads to good results.

Since in the case of query images no simple backgrounds can be expected, the ROIs are set to cover entire images. The subsequent post-processing of key-points follows the same scheme like in the case of reference images. Performed experiments indicate that limiting number of key-points in query images to 1200 is sufficient to ensure recognition of small objects "buried in cluttered scenes".

It should be stressed that the above post-processing and scale normalization step is playing an important role in the overall matching process and is crucial to ensure high recognition performance.

Construction of Visual Word Vocabularies

Object recognition requires establishing correspondences between key-points from the query image and all reference images. In cases of large collections of reference images an exhaustive search for the correspondences between key-points is not feasible from the point of view of the computational cost. In the proposed solution the exhaustive search among all possible key point correspondences/matches is avoided by quantizing the descriptor space into clusters in a way similar to the one discussed in [SZ03, SIV06]. In the literature such clusters are often referred to as "visual words" and collections of all visual words are often referred to as vocabularies. Vocabularies permit assignment of key-points to visual words with the most similar descriptors. This operation effectively assigns every key-point from the query image to an entire list of key-points from reference images that correspond to the same visual word.

In the implemented prototype the quantization is carried out by the well known K-means clustering. However, it is also possible to incorporate other clustering methods such as the Hierarchical K-Means from [NS06] (United States Patent 20070214172).

The clustering is performed off-line using key-points from images typical to a given application scenario. Using larger collections of images produces more generic dictionaries and leads to better recognition performance. However, since computational cost of creating visual dictionaries depends on the number of key-points, it is often needed to randomly select only a subset of available images [SZ03].

The number of clusters (i.e. dictionary size) affects the recognition performance and the speed of the recognition and indexing. Larger dictionaries (very small quantization cells) provide better distinctiveness but at the same time may decrease repeatability in the presence of noise. Moreover, larger dictionaries are computationally expensive to create, and result in much slower recognition. Following [SZ03] we have chosen to use dictionaries containing 10000 visual words that provide a good balance between distinctiveness, repeatability and recognition speed.

In principle, additions of new reference images do not require updating of the visual dictionary. On the other hand, re-creating the dictionary after significant changes in the collection of the reference images may improve the recognition performance. Such re-creation of the dictionary implies re-indexing of all reference images. Both, updating the dictionary and re-indexing can be performed off-line.

Following the suggestions from [SZ03, SIV06, NS06] a mechanism has been incorporated that excludes from the recognition process key-points that are assigned to very common visual words. In the literature, these very common visual words are commonly referred to as "visual stop words", due to some analogy to the text retrieval problem where very common words, such as 'and' or 'the' from the English language, are not discriminating. The frequency of visual words is computed based on their occurrences in the entire collection of reference images. The frequencies can be updated whenever there are significant changes to the collection of reference images. A predefined percentage (typically 1%) of visual words are stopped. In other words, key-points from the query images assigned to the most common visual words (in the present case 100) are not taken into account in the recognition process. It should be noted that the mechanism used for excluding the stop words differs slightly from the one proposed in [SZ03, SIV06, NS06]. In the present case the stop words are included for indexing of reference images. The stop words are taken into account only in the recognition stage, when key-points from the query image assigned to stop words are excluded from the matching process. This solution permits avoiding frequent re-indexing of the entire database when stop words change due to additions to the collection. Although, experiments that were performed indicate some improvements in the recognition performance due to the incorporation of the word stopping mechanism, this extension is not crucial to the performance of the proposed recognition engine.

Indexing Reference Images

In general terms, indexing of reference images involves extraction of local features and their organisation in a structure that allows their fast matching with features extracted from query images.

Figure 4:
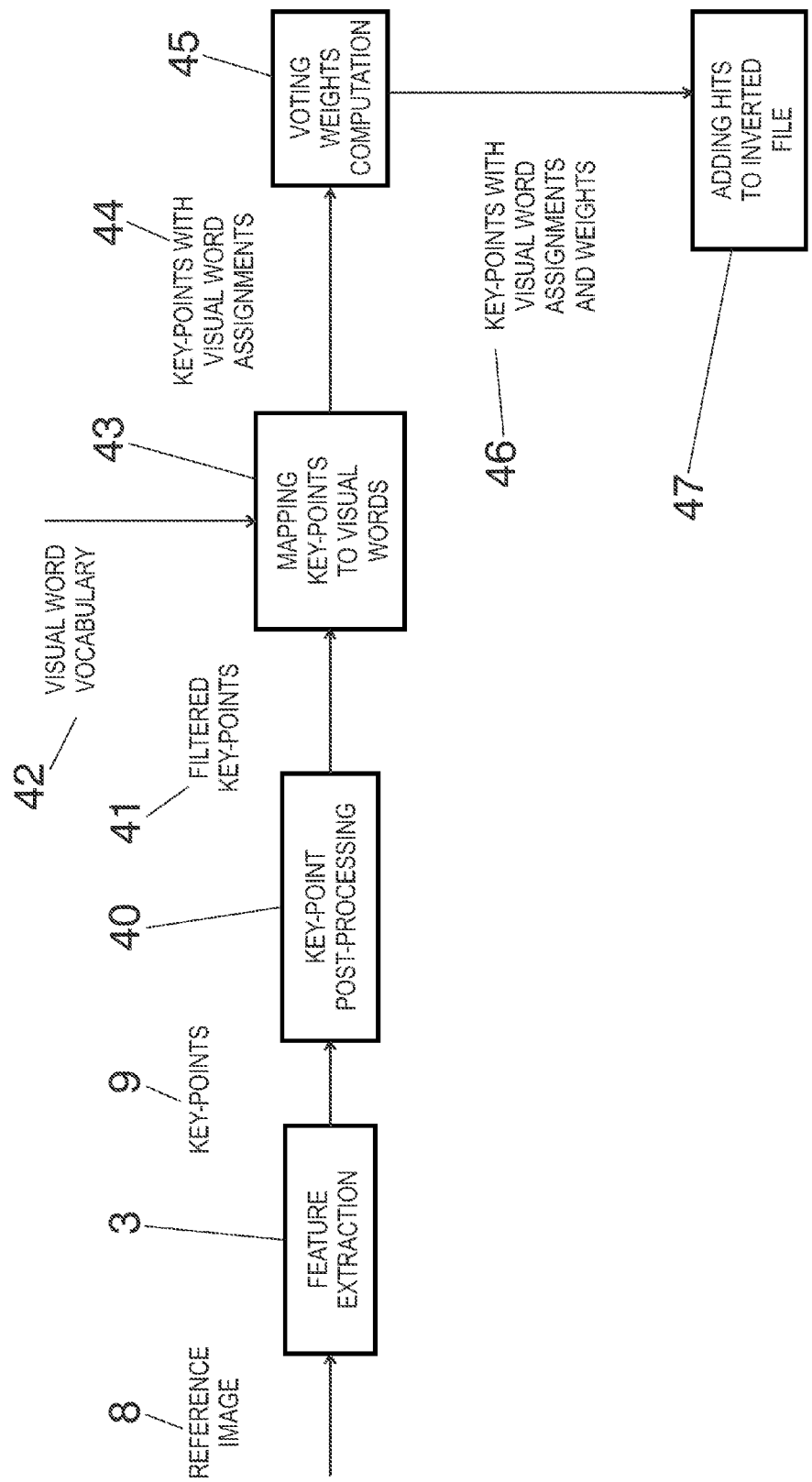
FIG. 4 shows an overview of the indexing process of the method depicted in FIG. 2.
Figure 5:
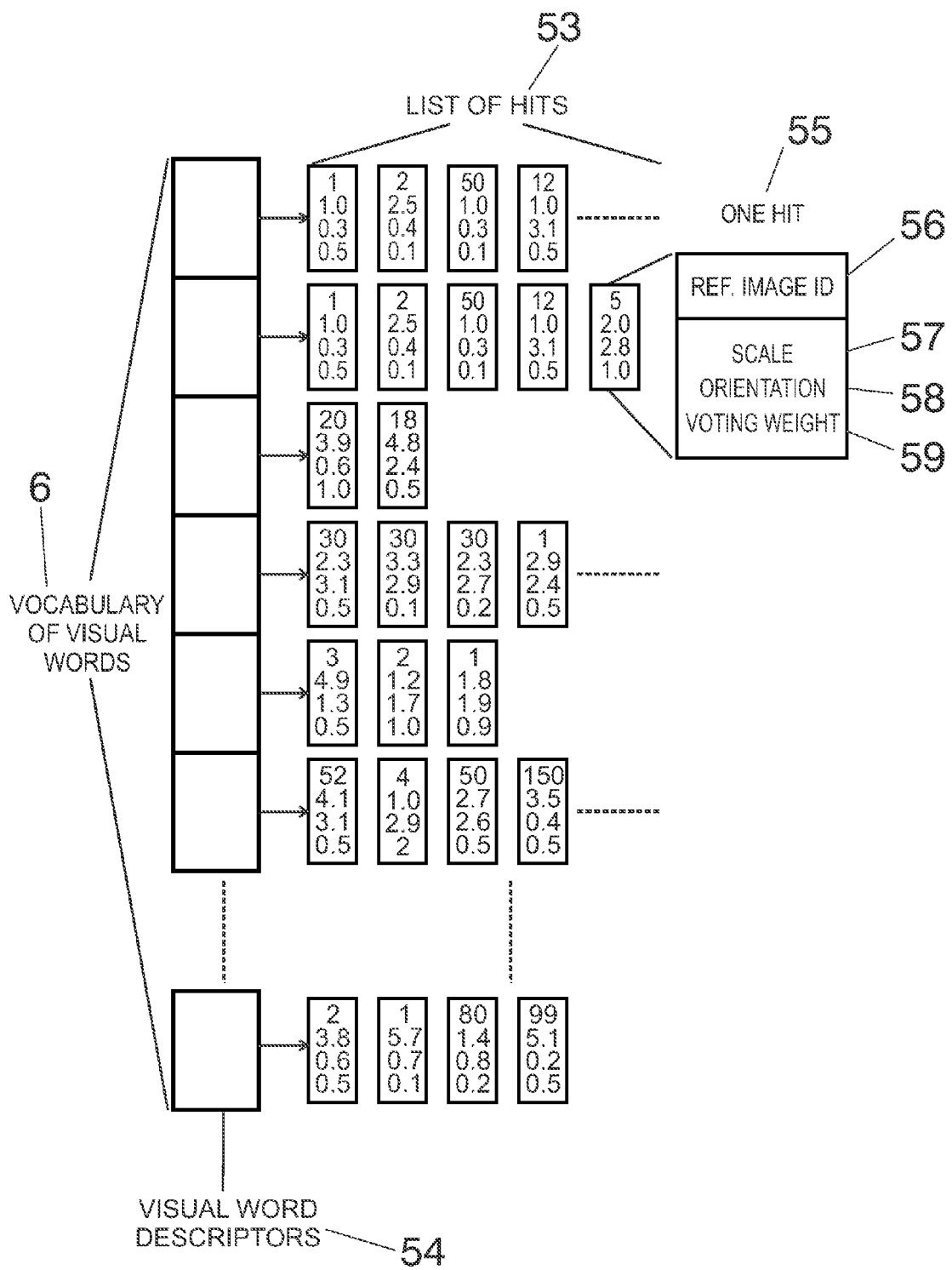
FIG. 5 shows an example of the inverted file structure used in the method according to the present invention.

An overview of the indexing process is shown in FIG. 4. The indexing of a new reference image starts with (i) key-point extraction and (ii) post-processing described in the section "Key-point Post Processing". In the next step, (iii) the extracted key-points are assigned to the closest visual words (i.e. words that represent them best). Specifically, every key-point is assigned a visual word (cluster) from the vocabulary that has the most similar descriptor. Once all key-points are represented with corresponding visual words, the consecutive step (iv) estimates their individual importance (weights) in the recognition process. The weights are estimated based on key-point scales and also on the numbers of key-points in the same image belonging to the same visual word and having similar orientation and scale. Finally, (v) all key-points and their weights are added to the inverted file structure as the so-called hits.

Since the first two steps have been described in section "Feature Extraction and Post Processing" the remainder of this section describes in detail only the last three steps specific to the indexing process.

Key-Point Classification

In this step every key-point from the image is assigned to a visual word with the most similar descriptor. This involves comparison of key-point descriptors with descriptors of visual words. In the current implementation the assignment is carried out by an exhaustive search of the entire vocabulary [SZ03, SIV06]. It should be noted that currently this is the most computationally intensive step of the indexing and recognition process. However, in the future it should be possible to incorporate the most recent methods for fast key-point classification such as the one proposed in [NS06].

Estimation of Key-Point Weights

In the proposed approach every key-point has associated a weighting factor (strength) that reflects its importance in the matching process. In the current implementation the weights are based on two main factors: (i) the scale at which the key-point was detected, and (ii) the number of key-points in the image assigned to the same visual word as the considered key-point and having similar orientation and scale.

The incorporation of key-points' scales in the weights is motivated by the fact that key-points detected at higher scales are more discriminatory than key-points detected at very low scales. In fact, many key-points detected at very low scales correspond to insignificant elements of the scene. Often such key-points are very common in many different reference images and therefore are not very discriminatory. At the same time, key-points detected at higher scales typically correspond to larger parts of the scene and are much more discriminatory.

Based on the above observation the weights were chosen to be proportional to scales at which key-points were detected. Specifically, weighting factor $w^i_S$ is corresponding to scale $s_i$ at which key-point i was detected is computed as:

$$w^i_S = \min(s_i, T_s),$$

where $T_s$ is an empirically chosen threshold that limits the influence of key-points detected at very high scales.

The second weighting factor $w^i_M$ is introduced in order to limit the influence of groups of key-points from the same image that are assigned to the same visual word and have similar orientation and scale. Specifically, weight $w^i_M$ for key-point i is computed as:

$$w^i_M = \frac{1}{N^i_S},$$

where $N^i_S$ denotes the number of key-points from the same image that are assigned to the same visual word as i and have the same orientation and scale. Two key-points are considered as having the same orientation and scale if the difference between their orientations and the scaling factor fall below some empirically defined thresholds.

Although cases where more than one key-point in the image are represented by the same visual word and have similar orientation and scale are not very common, weight $w^i_M$ plays an important role in adjusting the influence of such groups on the recognition process. Its exact role is explained in more detail in the section describing the voting scheme.

Final voting weight $w^i_K$ assigned to key-point i is computed as a dot product of weights corresponding to the two above weighting factors: $w^i_K = w^i_S w^i_S$.

The introduction of the above weights proven very effective in the proposed solution. However, it is probable that other weighting factors and/or combinations could achieve a similar effect.

Finally, the proposed weighting scheme allows easy addition of new weighting factors. In the future this could allow incorporation of key-point's spatial location (e.g. hits lying closer to the center of the image could be assigned more importance) or orientation (e.g. key-points with very common orientation within the image could be assigned less importance).

Construction of Inverted File Structure

The objective of the indexing stage is to organise local features extracted from reference images in a way that allows their fast matching with features extracted from query images. As demonstrated in [SZ03, NS06] one of the keys to fast object recognition is organization of local features into the so-called Inverted File Structure. Interestingly, this solution was motivated by popular text search engines, such as the one described in [BP98]. In the case of text retrieval, the inverted file has an entry (hit list) for each textual word, where every list stores all occurrences of the word in all documents. In the case of visual search, the structure has a hit list for every visual word storing all occurrences of the word in all reference images. It should be noted that, if the dictionary is sufficiently large comparing to the number of reference images, the hit lists are relatively short leading to very fast matching.

In the present approach some extensions to the inverted file structure were incorporated that are favourable to the matching solution. As in [SZ03, NS06], in the inverted file there is one list for every visual word that stores all occurrences (hits) of the visual word in all reference images—see FIG. 5. As in earlier approaches, every hit corresponds to one key-point from one reference image, i.e. every hit stores the identifier of the image that it describes. However, in the present case, every hit stores also additional information about key-point's scale, orientation and voting strength.

It should be stressed that the information stored in the hits is not only used to limit the number of compared images (as it was described in [SZ03, NS06]), but it plays central role in the objects recognition process.

Object Recognition

Figure 3:
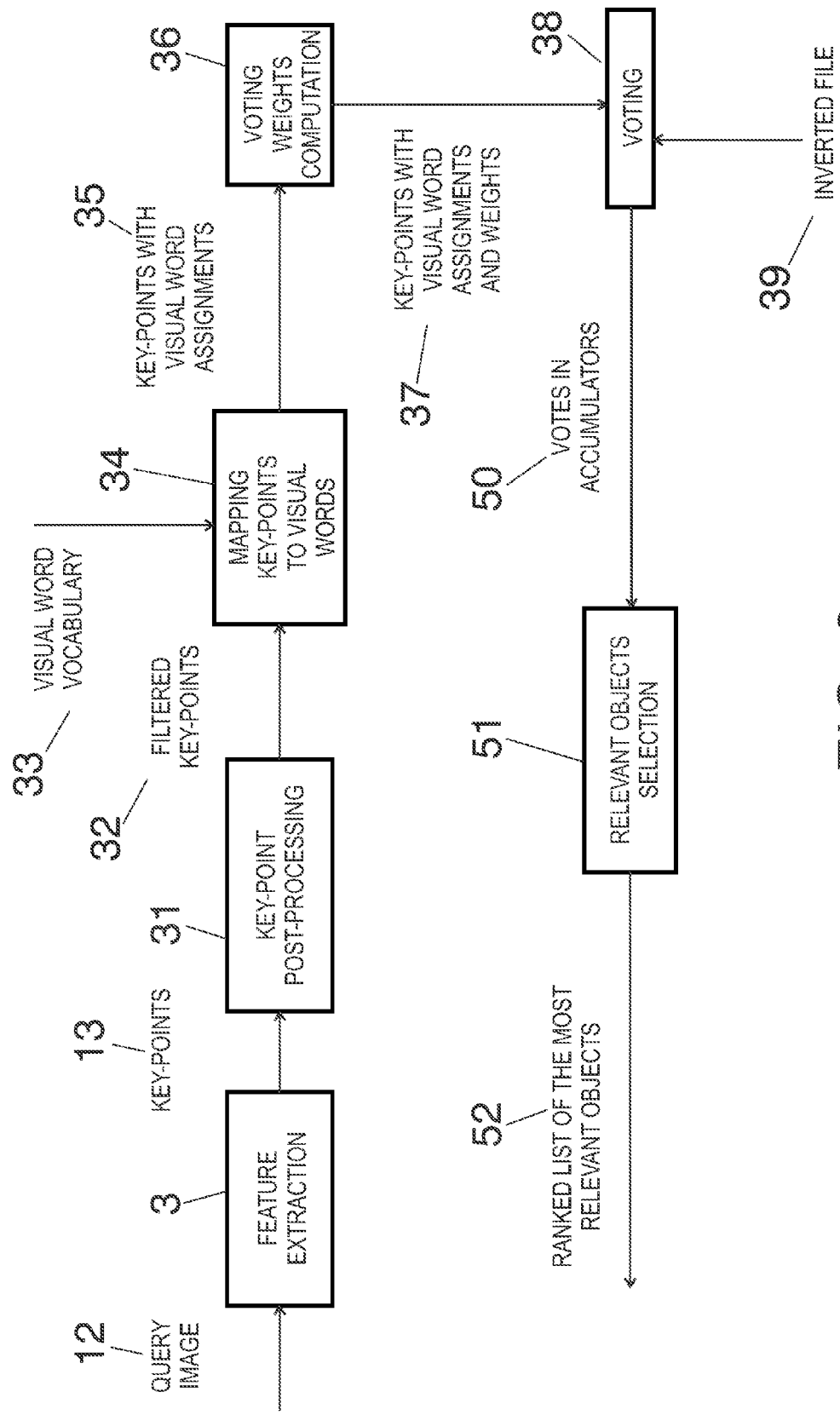
FIG. 3 shows an overview of the object recognition process of the method depicted in FIG. 2.

The identification of objects present in the query image starts with the same four steps as the indexing of reference images—see overview of the recognition process in FIG. 3. The process begins with (i) key-point extraction and (ii) post-processing, as described in the section "Feature Extraxtion and Post Processing". Next, the extracted key-points are (iii) assigned to visual words (see section "Key-Point Classification" for more details) and (iv) voting weights for all key-points are computed. It should be noted that assignment of a query key-point to a visual word is effectively equivalent to assigning the key-point to an entire lists of hits associated with the same visual word. Once the above four steps are completed, starts an (v) aggregation of votes for different reference images. Every pairing of a key-point from the query image and one of the hits assigned to the same visual word casts a vote into a pose accumulator corresponding to the reference image where the hit was found. In other words, every pair (query key-point, hit) votes for the presence of one reference object appearing with a specific rotation and scaling. The strength of each vote is computed as a dot product of the weights of the query key-point and the hit. Once all votes are casted, (vi) accumulators that received at least one vote are scanned in order to identify bins with the maximum number of votes. Values accumulated in these bins are taken as the final relevancy scores for the corresponding reference images. Finally, (vii) reference images are ordered according to their matching scores and the most relevant objects are selected based on an extension of the dynamic thresholding method from [ROS01]. Now, the steps specific to the matching process will be described in more detail.

Estimation of Key-Point Weights

In the case of query images voting weights associated with key-points are computed based solely on the number of key-points in the same image associated with the same visual word and having similar scale and orientation. Therefore, the weighting factor $w^i_{QK}$ for one key-point i is computed as:

$$w^i_{QK} = \frac{1}{N^i_S},$$

where $N^i_S$ denotes the number of key-points from the query image that are assigned to the same visual word as i and have similar orientation and scale.

It should be noted that the exclusion of scales from the weighting in the case of query images permits recognition of objects present in the scene irrespectively on their size. At the same time, the inclusion of scales in the weighing of hits from reference images gives more importance to hits that are typically more discriminatory without affecting the ability to recognize small object—see section "Estimation of Key-point Weights" for indexing reference images.

Voting

The voting stage is the most distinctive component of the proposed approach compared to the methods described in the literature. The main idea is to impose some pose consistency (rotation and scaling) between matched key points using the visual word vocabulary and the inverted file structure. This solution is possible because in the present case hits store not only identificators of corresponding reference images, but also orientation and scale of original key-points. This additional information permits estimation of the rotation and scaling between key points from the query image and hits corresponding to different reference images. In other words, for every matching hypothesis (pair of a query key-point and a hit) the transform entry predicting rotation and scaling of the reference object can be created.

Before the voting can start, one empty vote accumulator is assigned to every reference image. The accumulators are implemented as two-dimensional tables where every cell (bin) corresponds to a particular rotation and scaling of the reference object. This structure simply quantizes the pose transformation parameters of reference objects. One dimension of the accumulator corresponds to rotation of the reference object and the other one to its scaling.

As it has been explained earlier, the assignment of one visual word to a key-point from the query image is effectively equivalent to the assignment of an entire list of hits from reference images corresponding to the same visual word. Pairs (query key-point, hit) resulting from the assignment provide matching hypotheses.

During the voting process every matching hypothesis (pairing of a key-point from the query and one of the hits assigned to the same visual word) casts a vote into the accumulator corresponding to the reference image where the hit was found. Moreover, every such pair (query key-point, hit) votes not only for the presence of one reference object, but in fact for its appearance with a specific rotation and scaling transformation.

As it has been already explained earlier, the weighting scheme takes into account the presence of groups of key-points assigned to the same visual word and having similar orientation and scale. The reason of this additional weighting factor can be explained best by analysing in detail the voting scheme. Ideally one pair of corresponding key points (one from the query and the other from the reference image) would cast one vote to the accumulator corresponding to the reference image. However, in cases where multiple hits from one reference image are assigned to the same visual word and have similar orientation and scale, every key point from the query image assigned to the same visual word will cast multiple votes (one with each of such hit) into the same accumulator bin. For example, if a reference object happens to generate three key points represented by the same visual word and with the same orientation and scale, then every key point from the query that is also assigned to the same visual word will cast three votes (instead of one) to the same accumulator bin. The weighting scheme simply ensures that the multiple votes casted by such groups play the adequate role in the computation of the matching scores.

Computation of Scores

Once all votes are casted, accumulators are scanned in order to identify bins with the maximum number of votes. The votes accumulated in these maxima are taken as the final matching scores, i.e. scores indicating how well the reference images corresponding to the accumulators where these maxima were found match the query image. In other words, for a given query, the matching score for each reference image is obtained by taking the votes accumulated in the bin with the maximum number of votes found in the accumulator corresponding to this reference image. It should be noted that these bins represent the most likely pose transformations (i.e. rotation and scaling) between the query images and corresponding reference images.

It should be noted that the proposed approach is primarily intended for detecting presence or absence of reference objects in the query image. Therefore, it is sufficient to identify only the most voted bin in each accumulator and ignore multiple occurrences of the same reference object. We should note that identification of poses of all instances of the same reference object would require identification of all local maxima in the corresponding accumulator.

Ordering and Selection of Relevant Reference Objects

The last stage of the search involves ordering and selection of the results that are relevant to the query image. In many applications this task can be reduced to a trivial selection of the reference object that obtained the highest score.

Figure 10:
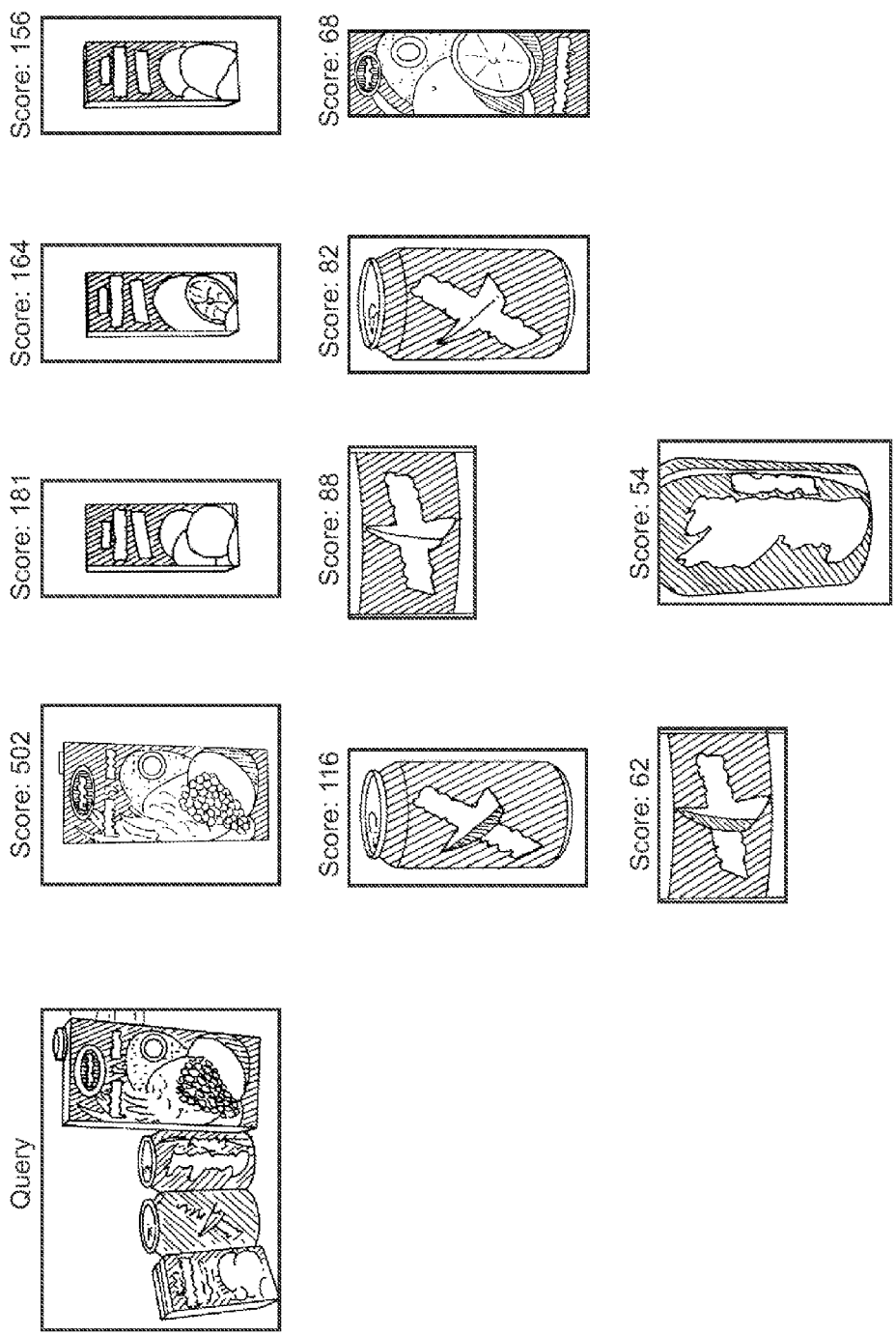
FIG. 10 shows an example of identification of multiple small objects with the method according to the present invention.

In contrast, the present approach is capable of identifying multiple relevant objects present in the query, see example results in FIG. 10. The returned list of objects is ordered according to the obtained scores. Moreover, the system does not return any results in cases where no relevant objects are present in the query image.

In other words, the objective of this stage is to use the matching scores produced in earlier stages to identify only the most salient objects present in the query and at the same time to avoid returning irrelevant results. The basic idea behind the approach is to order the reference images according to their matching scores and then select only the top objects from the sorted list by using an extension of the dynamic thresholding method from [ROS01].

It should be noted that the motivation behind incorporating the dynamic threshold was provided by the fact that typical scores obtained by relevant objects can vary in a wide range of values (from ~40 for queries with few key-points to ~300 for queries with large number of key points). Since it is impossible to choose a fixed threshold that will provide meaningful results for such extreme cases it is proposed to use the shape of the curve created by the ordered list of scores to identify the most adequate threshold.

The selection of the dynamic threshold begins with the sorting of reference images according to the obtained matching scores and the application of the thresholding method proposed in [ROS01]. This results in an initial separation of the ordered list into two groups: (i) potentially relevant objects at the top of the list, and (ii) probably irrelevant objects in the remaining part of the list. This step is followed by computation of an average value of scores from the second part of the list that contains the potentially irrelevant objects. This value (denoted as $T_{ir}$) provides a reference score typical for objects that are irrelevant to the current query image. The dynamic threshold $T_d$ is computed as $T_d = \alpha T_{ir}$, where the value of $\alpha$ is empirically set to 4. The final threshold $T_c$ is computed as $T_c = \max(T_d, T_f)$, where $T_f$ denotes a fixed threshold, empirically set to 30, that provides a minimum value of the threshold below which it is unlikely to encounter relevant results. $T_f$ ensures meaningful results for queries that typically result in very low scores and for which the dynamic threshold could return irrelevant results.

Once the final threshold $T_c$ is computed, the system classifies the top reference objects that obtained scores above the threshold as being present in the query image.

The present invention is preferably implemented by means of a suitable computer program loaded to a general purpose processor.

Results

FIGS. 6-10 contain selected results demonstrating the most interesting capabilities of the invention. All the experiments were conducted with a collection of 70 reference images. Typically the time required for a successful identification does not exceed 2 seconds when ran on a standard PC. Moreover, the recognition time increases very slowly with the size of the collection of reference images.

Figure 6:
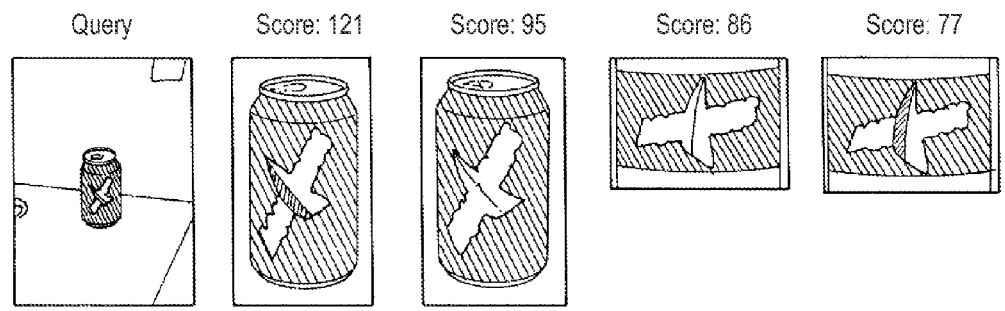
FIG. 6 shows an example of identification of a small object with the method according to the present invention.

FIG. 6 shows an example of identification of a small object. The first column contains the query image and the remaining columns contain retrieved products ordered from left to right according to their scores.

Figure 7:
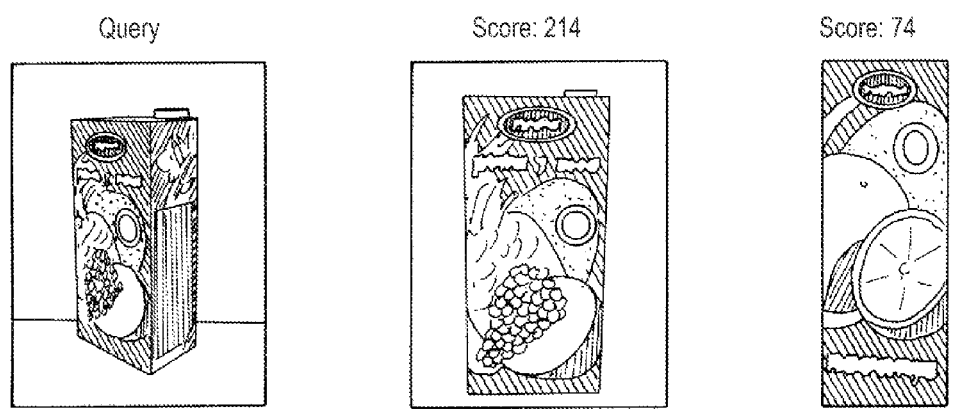
FIG. 7 shows an example of identification of an object with a difficult pose with the method according to the present invention.

FIG. 7 shows an example of identification of an object with difficult pose (inclination of approx. 45 degrees). The first column contains the query image and the remaining columns contain retrieved products ordered from left to right according to their scores. It should be noted that the second retrieved product has an identical trademark as the query ("Juver").

Figure 8:
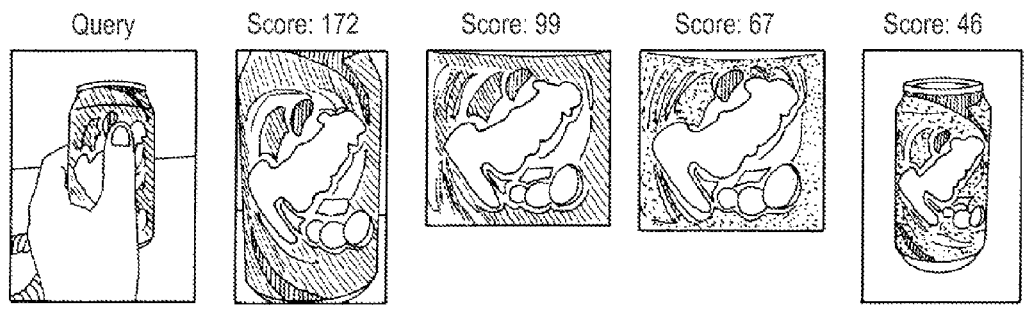
FIG. 8 shows an example of identification of an occluded object with the method according to the present invention.

FIG. 8 shows an example of identification of an occluded object. The first column contains the query image and the remaining columns contain retrieved products ordered from left to right according to their scores.

Figure 9:
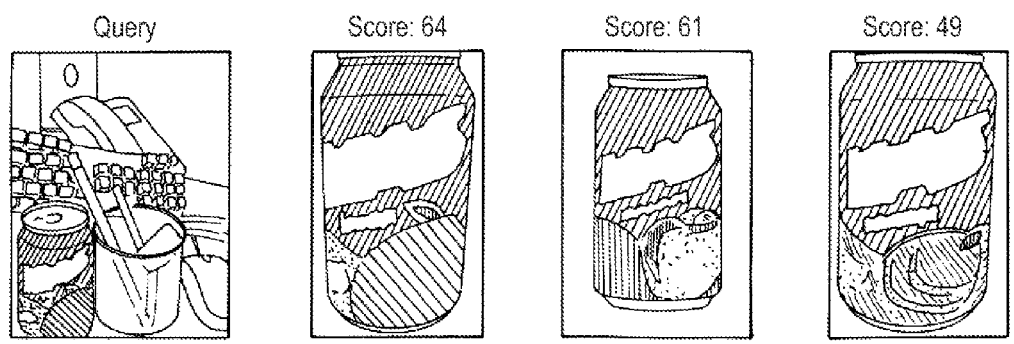
FIG. 9 shows an example of identification of a small object in a cluttered scene with the method according to the present invention.

FIG. 9 shows an example of identification of a small object in a cluttered scene. The first column contains the query image and the remaining columns contain retrieved products ordered from left to right according to their scores.

FIG. 10 shows an example of identification of multiple small objects. The first column contains the query image and the remaining columns contain retrieved products ordered from left to right and from top to bottom according to their scores.

INDUSTRIAL APPLICATION

The proposed invention allows a novel type of efficient recognition engines that deliver results in response to photos instead of textual words. Such engines have potential to become the key enabling technology for multitude of industrial applications.

Applications for Mobile Phones

Figure 11:
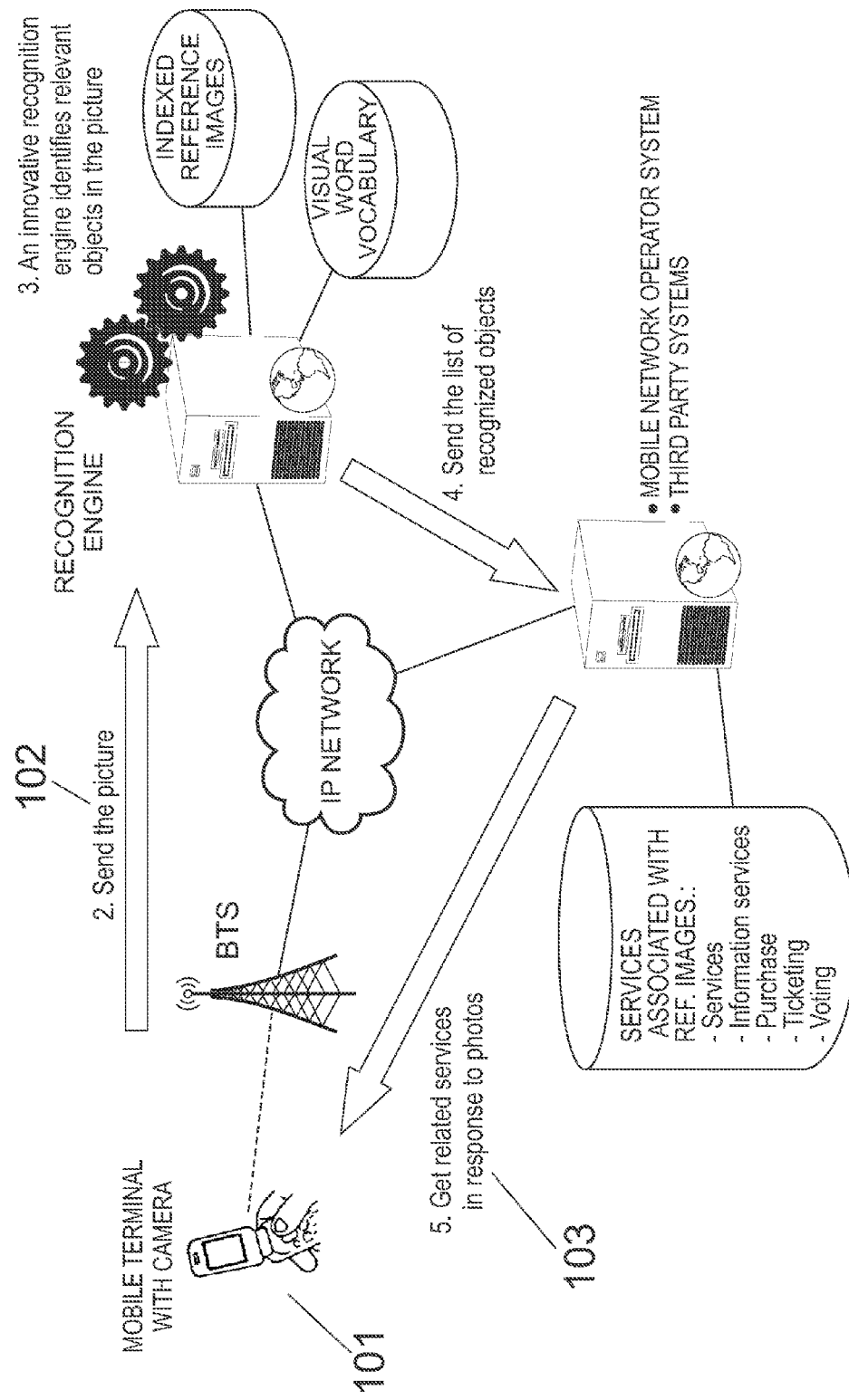
FIG. 11 shows an example of an industrial application of the method according to the present invention.

The main motivation for the present invention was provided by the believe in an enormous commercial potential for systems allowing users to simply take a picture with a mobile phone camera, send it, and receive related services—see an example embodiment of the invention ("mobile visual search") in FIG. 11. The system allows users to simply take a picture with a mobile phone camera, send it, and receive related services.

A lot of effort has been made in ensuring that the proposed invention is well suited to recognition of wide range of 3D products (e.g. books, CDs/DVDs, packed products in food stores), city posters, photos in newspapers and magazines, trademarks, etc. The above capability allows development of a wide range of novel services for mobile phones users, which will capitalize on user curiosity and/or facilitate the so-called impulsive shopping. It is easy to imagine many attractive use case scenarios where users check information about certain products (e.g. price comparison) or even make purchases directly by taking a photo of a particular object. Some examples from this category include buying audiovisual contents by taking pictures of their ads in magazines, or purchasing tickets for a music concert by simply taking a photo of a city poster. Moreover, the proposed invention can play an enormous role in developing novel models of interactive advertising, e.g. users can participate in a draw by taking a photo of an advertisement encountered on the street.

In the future, the proposed technology could be combined with geo-location, and augmented reality technologies allowing users to tag and retrieve information about real world scenes by simply holding up their mobile phones and taking pictures.

Other Applications

Near-Duplicate Detection

The invention could be used for detection of near-duplicate photos which has application in copyrights violation detection and photo archiving, e.g. organizing collections of photos.

Contextual Advertising

The invention could be used for detection of trademarks appearing in images and videos, which could be applied by content providers to introduce new models of contextual advertising.

Advertisement Monitoring Across Various Media

The invention could be used as a core technology for tools providing automatic monitoring of commercial campaigns across various types of media such as for example TV and Internet. Such tools could automatically monitor TV programs and Internet (both user generated content and online magazines) searching for occurrences of trademarks or particular ads of specific companies, e.g. in order to analyze impact of a particular commercialization campaign.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

REFERENCES

[BL97] J. Beis and D. G. Lowe. Shape indexing using approximate nearestneighbour search in high-dimensional spaces. In *Conference on Computer Vision and Pattern Recognition*, Puerto Rico, 1997.

[BP98] S. Brin and L. Page. The anatomy of a large-scale hypertextual web search engine. In *Computer Networks and ISDN Systems*, 1998.

[BTG06] Herbert Bay, Tinne Tuytelaars, and Luc Van Gool. Surf: Speeded up robust features. In *ECCV*, 2006.

[BYRN99] R. Baeza-Yates and B. Ribeiro-Neto. Modern information retrieval. In *ACM Press, ISBN:* 020139829, 1999.

[EVO] Evolution. www.evolution.com.

[FLI] Flickr. http://www.flickr.com/.

[HOU62] P. V. C. Hough. Method and means for recognizing complex patterns. In U.S. Pat. No. 3,069,654, 1962.

[KOO] Kooaba. http://www.kooaba.com.

[LOW99] D. Lowe. Object recognition from local scale-invariant features. In *ICCV,* 1999.

[LOW04] D. Lowe. Distinctive image features from scale-invariant keypoints, cascade filtering approach. In *IJCV,* 2004.

[LSDJ06] M. Lew, N. Sebe, Ch. Djeraba, and R. Jain. Content-based multimedia information retrieval: State of the art and challenges. In *ACM Transactions on Multimedia Computing, Communications, and Applications,* 2006.

[MCUP02] J. Matas, O. Chum, M. Urban, and T. Pajdla. Robust wide-baseline stereo from maximally stable extremal regions. In *Proc. of the British Machine Vision Conference*, Cardiff, UK, 2002.

[MS04] K. Mikolajczyk and C. Schmid. Scale and affine invariant interest point detectors. In *IJCV,* 2004.

[NS06] D. Nister and H. Stewenius. Scalable recognition with a vocabulary tree. In *Proc. of the IEEE Conference on Computer Vision and Pattern Recognition,* 2006.

[PCI+07] J. Philbin, O. Chum, M. Isard, J. Sivic, and A. Zisserman. Object retrieval with large vocabularies and fast spatial matching. In *Proc. CVPR,* 2007.

[PCI+08] J. Philbin, O. Chum, M. Isard, J. Sivic, and A. Zisserman. Lost in quantization: Improving particular object retrieval in large scale image databases. 2008.

[ROS01] P. Rosin. Unimodal thresholding. In *Pattern Recognition*, vol. 34, no. 11, pp. 2083-2096, 2001.

[SIV06] Josef Sivic. Efficient visual search of images and videos. In *PhD thesis at University of Oxford,* 2006.

[SUP] Superwise. www.superwise-technologies.com.

[SZ03] J. Sivic and A. Zisserman. Video google: A text retrieval approach to object matching in videos. In *Proc. ICCV,* 2003.

The invention claimed is:

1. Method of identification of objects in images characterised in that it comprises the following stages:
   (i) a feature extraction stage, performed by a processor, including the following steps for both: reference images, i.e. images representing each at least a single reference object, and at least one query image, i.e. an image representing unknown objects to be identified:
       (a) identification of key-points, i.e. salient image regions;
       (b) post-processing of key-points where key-points that are not useful for the identification process are eliminated;
       (c) computation of the descriptors, i.e. representations, of the key-points,
   (ii) an indexing stage of reference images, performed by the processor, including the following steps:
       (a) key-point extraction;
       (b) post-processing of key-points where key-points that are not useful for the identification process are eliminated;
       (c) assignment of key-points to visual words of a visual word vocabulary created from a collection of training images, wherein the visual words are centres of clusters of key-point descriptors;
       (d) addition of key-points to an inverted file structure, wherein the inverted file structure comprises a hit list for every visual word that stores all occurrences of the word in the reference images and wherein every hit stores an identifier of the reference image where the key-point was detected; and
   (iii) a stage of recognition of objects present in the query image, performed by the processor, including the following steps:
       (a) key-point extraction;
       (b) post-processing of key-points where key-points that are not useful for the identification process are eliminated;
       (c) assignment of key-points to visual words of the visual word vocabulary;
       (d) for each pairing of a key-point from the query image and one of the hits assigned to the same visual word aggregating a vote into an accumulator corresponding to the reference image of the hit; and
       (e) identification of the matching scores corresponding to the reference images based on the votes of the accumulators,
   characterised in that the post-processing comprises:
       normalizing key-point scales according to the region of interest of reference objects; and
       eliminating key-points that cannot effectively contribute to the identification process based on their normalized scales.

2. Method according to claim 1 wherein the stage of recognition (iii) of objects comprises the further step of selecting object or objects that are relevant to the query according to their matching scores.

3. Method according to claim 1 or 2, wherein the post processing includes the automatic detection of regions of interests based on the locations of detected key-points.

4. Method according to claim 3, wherein in the case of reference images the center of the region of interest is estimated as the center of the mass of the set of all detected key-point locations, its initial width and height are computed independently in the horizontal and vertical directions as a function of the standard deviation of key-point locations, the key-point locations being weighted according to the normalized key-point scales, and wherein the initial width and height are shrunk whenever the region of interest covers areas without key-points.

5. Method according to claim 4, wherein the scales of the key-points are normalized as a function of the size of the region of interest, and key-points located outside the region of interest and key-points with a normalized scale smaller than a predetermined value are eliminated.

6. Method according to claim 3, wherein the scales of the key-points are normalized as a function of the size of the region of interest, and key-points located outside the region of interest and key-points with a normalized scale smaller than a predetermined value are eliminated.

7. Method according to claim 1, wherein stages (ii) and (iii) include associating a weighting factor to each key-point reflecting its importance in the process of recognition of objects, which weighting factor is based on the normalized key-points scale.

8. Method according to claim 7, wherein the weighting factor is based on the detected key-points scale, said key-points scale being the normalized key-points scale, and the number of key-points from the same image assigned to the same visual word as the considered key-point and having similar orientation and scale.

9. Method according to claim 7 or 8, wherein in step (iii) (d) the weighting factor is used in the process of aggregating votes, which weighting factor is based on the normalized key-points scale.

10. Method according to claim 1 or 2, wherein in step (ii) (d) every hit stores additionally to the identifier of the reference image where the key-point was detected information about its scale and orientation and every hit has an associated strength of the evidence with which it can support an existence of the corresponding object in response to an occurrence of the visual word in an input image.

11. Method according to claim 10, wherein in step (iii) (d) the accumulator corresponding to the reference image is implemented as a two-dimensional table wherein one dimension of the accumulator corresponds to rotation of the reference object and the other dimension to scaling of the reference object, so that every cell corresponds to a particular rotation and scaling of the reference object and wherein a vote is for the appearance of the reference object with a specific rotation and scaling transformation.

12. Method according to claim 11, wherein in step (iii) (e) the cell with the maximum number of votes in every accumulator is identified.

13. Method according to claim 12, wherein in step (iii) (f) the reference image corresponding with the highest matching score selected as the most relevant object.

14. Method according to claim 12, wherein accumulators are scanned in order to identify bins with the maximum number of votes and the votes accumulated in these maxima are taken as the final matching scores, i.e. scores indicating how well the reference images corresponding to the accumulators where these maxima were found match the query image.

15. A non-transitory computer-readable medium having stored thereon computer program code which, when executed by a processor, causes the processor to perform the steps according to claim 1.

16. System comprising
a processor; and
a computer-readable medium having stored thereon computer program code which, when executed by the processor, causes the processor to perform the following stages:
(i) a feature extraction stage including the following steps for both: reference images, i.e. images representing each at least a single reference object, and at least one query image, i.e. an image representing unknown objects to be identified:
(a) identification of key-points, i.e. salient image regions;
(b) post-processing of key-points where key-points that are not useful for the identification process are eliminated;
(c) computation of the descriptors, i.e. representations, of the key-points,
(ii) an indexing stage of reference images including the following steps:
(a) key-point extraction;
(b) post-processing of key-points where key-points that are not useful for the identification process are eliminated;
(c) assignment of key-points to visual words of a visual word vocabulary created from a collection of training images, wherein the visual words are centres of clusters of key-point descriptors;
(d) addition of key-points to an inverted file structure, wherein the inverted file structure comprises a hit list for every visual word that stores all occurrences of the word in the reference images and wherein every hit stores an identifier of the reference image where the key-point was detected; and
(iii) a stage of recognition of objects present in the query image including the following steps:
(a) key-point extraction;
(b) post-processing of key-points where key-points that are not useful for the identification process are eliminated;
(c) assignment of key-points to visual words of the visual word vocabulary;
(d) for each pairing of a key-point from the query image and one of the hits assigned to the same visual word aggregating a vote into an accumulator corresponding to the reference image of the hit; and
(e) identification of the matching scores corresponding to the reference images based on the votes of the accumulators,
characterised in that the post-processing comprises:
normalizing key-point scales according to the region of interest of reference objects; and
eliminating key-points that cannot effectively contribute to the identification process based on their normalized scales.

* * * * *